US 6,736,103 B2

(12) United States Patent
Hunt et al.

(10) Patent No.: US 6,736,103 B2
(45) Date of Patent: May 18, 2004

(54) SYSTEM FOR MANAGEMENT OF FUEL IN A COLD START FUEL PASSAGEWAY

(75) Inventors: Frank Warren Hunt, West Bloomfield, MI (US); Shigeru Oho, Farmington Hills, MI (US); Ayumu Miyajima, Farmington Hills, MI (US)

(73) Assignee: Hitachi Ltd., Tokyo (JP)

( * ) Notice: Subject to any disclaimer, the term of this patent is extended or adjusted under 35 U.S.C. 154(b) by 50 days.

(21) Appl. No.: 10/274,682

(22) Filed: Oct. 21, 2002

(65) Prior Publication Data
US 2004/0074465 A1 Apr. 22, 2004

(51) Int. Cl.[7] .................................................. F02B 3/00
(52) U.S. Cl. ............. 123/299; 123/179.12; 123/179.15; 123/480; 123/491
(58) Field of Search ........................ 123/179.12, 179.13, 123/179.14, 179.15, 179.16, 298, 299, 480, 491; 701/113

(56) References Cited

U.S. PATENT DOCUMENTS

| 4,361,125 A | 11/1982 | Igashira et al. ............. 123/549 |
|---|---|---|
| 4,606,319 A | 8/1986 | Silva .......................... 123/525 |
| 5,284,117 A | 2/1994 | Akase ......................... 123/445 |
| 5,353,591 A | 10/1994 | Kabasin et al. ............... 60/274 |
| 5,465,701 A | 11/1995 | Hunt ........................... 123/531 |
| 5,482,023 A | 1/1996 | Hunt et al. .................. 123/491 |
| 5,529,035 A | 6/1996 | Hunt et al. ............ 123/179.15 |
| 5,894,832 A | 4/1999 | Nogi et al. .................. 123/491 |
| 6,067,972 A | 5/2000 | Jaasma ........................ 123/549 |
| 6,109,247 A | 8/2000 | Hunt ........................... 123/549 |
| 6,176,226 B1 | 1/2001 | Nines et al. ................. 123/549 |
| 6,279,549 B1 | 8/2001 | Hunt et al. .................. 123/549 |
| 6,318,334 B1 | 11/2001 | Reale et al. ................. 123/198 |
| 6,354,256 B1 | 3/2002 | Ohanian et al. ........ 123/179.21 |
| 6,360,529 B1 | 3/2002 | Surnilla et al. ............... 60/274 |
| 6,371,074 B1 | 4/2002 | Keller ......................... 123/198 |
| 6,557,521 B2 * | 5/2003 | Ichihara et al. ............. 123/299 |
| 2002/0050265 A1 | 5/2002 | Yoshida et al. ............. 123/295 |
| 2002/0073955 A1 | 6/2002 | Collins et al. .............. 123/198 |

FOREIGN PATENT DOCUMENTS

| JP | 55134718 | 10/1980 |
|---|---|---|
| JP | 2001065388 | 3/2001 |

* cited by examiner

Primary Examiner—Mahmoud Gimie
Assistant Examiner—Arnold Castro
(74) Attorney, Agent, or Firm—Gifford, Krass, Groh, Sprinkle, Anderson & Citkowski

(57) ABSTRACT

A system for the management of fuel and fuel vapors in the cold start fuel passageway of an internal combustion engine which has a cold start fuel injector which, when activated, introduces fuel into the cold start fuel passageway. The system includes an engine control unit (ECU) which determines the probability of fuel within the cold start passageway. Different procedures programmed in the ECU are then utilized to dissipate the fuel from the cold start passageway. These procedures include delaying the initiation of the spark ignition for the engine, maintaining the heater associated with the cold start fuel injector activated for a period of time following deactivation of the cold start fuel injector, maintaining revolution of the internal combustion engine for a predetermined time period, as well as other strategies.

33 Claims, 6 Drawing Sheets

SYSTEM FOR MANAGEMENT OF FUEL IN A COLD START FUEL PASSAGEWAY

BACKGROUND OF THE INVENTION

I. Field of the Invention

The present invention relates to internal combustion engines having a cold start fuel system and, more particularly, to a system for dissipating fuel in the cold start fuel passageway during engine shut down or start up.

II. Description of Related Art

Governmental regulations restrict the maximum amount of hydrocarbon, nitrous and other emissions from an internal combustion engine of the type using liquid fuel in automotive applications. A critical factor, however, affecting the hydrocarbon emissions from an internal combustion engine occurs during the "cold start" phase immediately following ignition of the engine from a cold ambient condition.

During the cold start phase for the automotive engine, which typically lasts for approximately two minutes following engine ignition, the catalytic converter of the type used in automotive vehicles is cold and thus ineffective in reducing automotive emissions from the exhaust stream. Additionally, fuel enrichment is oftentimes necessary to ensure satisfactory engine ignition when the engine is in a cold state.

Consequently, during a cold start of the automotive internal combustion engine, the air/fuel ratio is much richer than stoichiometric combustion, typically 10–14:1. However, up to 50% of the hydrocarbon emissions permitted by government regulations can occur during the first twenty seconds or so following engine ignition. Furthermore, these governmental emission restrictions become increasingly stringent with the passage of time.

In order to reduce hydrocarbon emissions during cold start of the invention, it is desirable to start the engine with a stoichiometric or lean fuel charge, i.e. an air/fuel ratio in the range of 14.5–16.1. In order to achieve such a lean fuel mixture during an engine cold start and still ensure satisfactory ignition of a cold engine, there have been a number of previously known cold start fuel systems which provide the fuel charge to the combustion chambers of the engine during a cold engine start condition in lieu of the multipoint fuel injectors which normally provide fuel to the engine during a warm engine condition. One such cold start fuel system is disclosed in U.S. Pat. No. 5,894,832, entitled "Cold Start Engine Control Apparatus and Method" and which issued on Apr. 10, 1999.

These previously known cold start fuel systems typically comprise a cold start fuel passageway having one end fluidly connected through a valve to the intake manifold of the engine upstream from the throttle. The second or downstream end of the cold start fuel injector is fluidly open to the intake manifold, typically immediately adjacent the engine combustion cylinders. A cold start fuel injector under control of the fuel management system for the engine controls actuation of the cold start fuel injector to inject fuel into the cold start fuel passageway. One or more heaters are then typically contained within or adjacent the cold start fuel passageway to enhance vaporization of the fuel prior to its introduction to the engine combustion chambers.

These previously known cold start fuel injector systems have proven satisfactory in use as well as compliant with government emission regulations as long as the engine, following engine emission, proceeds from a cold engine ignition and to a warm engine operating condition at which the cold start fuel injector is deactivated and fuel is instead provided to the engine through the conventional multipoint fuel injectors. Conversely, several problems arise where the engine, following engine ignition, is shut down prior to a warm engine operating condition. When this occurs, i.e. when engine shut down occurs while the cold start fuel injector is still supplying the engine with its fuel vapor charge, fuel vapors can and do remain in the cold start fuel passageway. Indeed, in some cases, pooling of liquid fuel can occur in the cold start fuel passageway when an engine shut down occurs during the cold start operation of the engine.

Still other engine conditions and/or malfunctions can also result in fuel vapor or pooled fuel in the cold start fuel passageway. For example, a malfunctioning cold start heater or cold start fuel injector can also result in fuel vapor or pooled fuel in the cold start passageway.

The presence of fuel vapor or liquid fuel within the cold start fuel passageway disadvantageously can increase the emission of hydrocarbon and other noxious emissions during the next subsequent engine start up. Furthermore, if excessive fuel vapor remains in the cold start fuel passageway upon the subsequent engine start up, undesirable backfiring of the engine can even occur.

There are no previously known systems or procedures for dissipating fuel vapors and fuel contained within the cold start passageway in the event of a premature engine shut down, i.e. shut down of the engine during a cold operating condition, or other engine conditions or component malfunctions.

SUMMARY OF THE PRESENT INVENTION

The present invention provides both a system and procedures for dissipating fuel and fuel vapors contained within the cold start passageway of a cold start fuel system for an internal combustion engine.

In brief, the method and system of the present invention is designed for use with an internal combustion engine of the type used in automotive vehicles. These automotive engines include a cold start fuel system having both a cold start fuel injector as well as a cold start fuel passageway. During a cold engine operating condition, the cold start fuel injector provides fuel to the engine in lieu of the multipoint fuel injectors used during a warm engine condition by injecting fuel into the cold start fuel passageway. A heater within the cold start fuel passageway vaporizes the fuel and this fuel vapor is then inducted into the internal combustion engine in the desired fashion.

The system of the present invention includes an engine control unit (ECU) which determines the probability of fuel within the cold start fuel passageway either at engine shut off or engine turn on. There are a number of different ways of determining the probability of fuel within the cold start fuel passageway. For example, an engine shut down during a cold start operating condition is indicative of fuel vapor within the cold start fuel passageway.

Similarly, the current through the heater of the cold start fuel heater can be stored upon engine shut off in digital memory accessible by the engine control circuit. Thereafter, upon a subsequent engine start up, the previously stored value of the heater current is examined by the engine control circuit to determine if that heater current value is above a predetermined threshold. If not, indicative of a heater malfunction, there is a probability of fuel or fuel vapors in the cold start passageway upon a subsequent use of the cold start system upon the next engine start up.

Similarly, the duty cycle of activation of the cold start fuel injector can also be determined and compared with an acceptable range. If this duty cycle is outside the acceptable range, it is indicative of a malfunction of the cold start injector. Operation of the cold start system upon the next engine start up could result in fuel or fuel vapor within the cold start fuel passageway.

In the event that the ECU determines the probability of fuel within the cold start fuel passageway, the present invention provides a number of different procedures programmed in the ECU designed to dissipate the fuel from the cold start fuel passageway. These procedures minimize the creation of noxious emissions and hydrocarbons and even prevent possible backfiring of the internal combustion engine.

In a first procedure, in the event that there is a probability of fuel within the cold start passageway, the engine control circuit maintains activation of the cold start heater by providing electrical power to the cold start heater for a predetermined period following the transition from the cold start engine operating condition and to a warm engine operating condition. The continued activation of the heater even after the cold start fuel injectors have been deactivated ensures that any fuel that may be present on the heater is dissipated and supplied to the engine.

In yet a different procedure, in the event that the engine is shut down during a cold start engine operating condition, the multipoint fuel injector system is activated for a predetermined period of time despite engine shut down to ensure a few revolutions of the engine. The continued revolution of the engine thus inducts any fuel vapors which may be present in the cold start fuel passageway into the engine for combustion.

In yet a further procedure to dissipate fuel vapors present within the cold start fuel passageway, the ECU delays the initiation of the spark ignition system for the engine for a few revolutions upon a subsequent engine start up condition. Such delay in the initiation of the spark system ensures that fuel vapors contained within the cold start fuel passageway are inducted to the engine combustion chambers. Such delay in the initiation of the spark ignition system also reduces or completely eliminates the possibility of backfiring of the engine. Additionally, preferably the throttle is in a closed position while dissipating the vapors from the cold start fuel passageway so that the air inducted by the rotation of the engine passes through the cold start fuel passageway.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED Embodiments of the Present Invention

Figure 1:
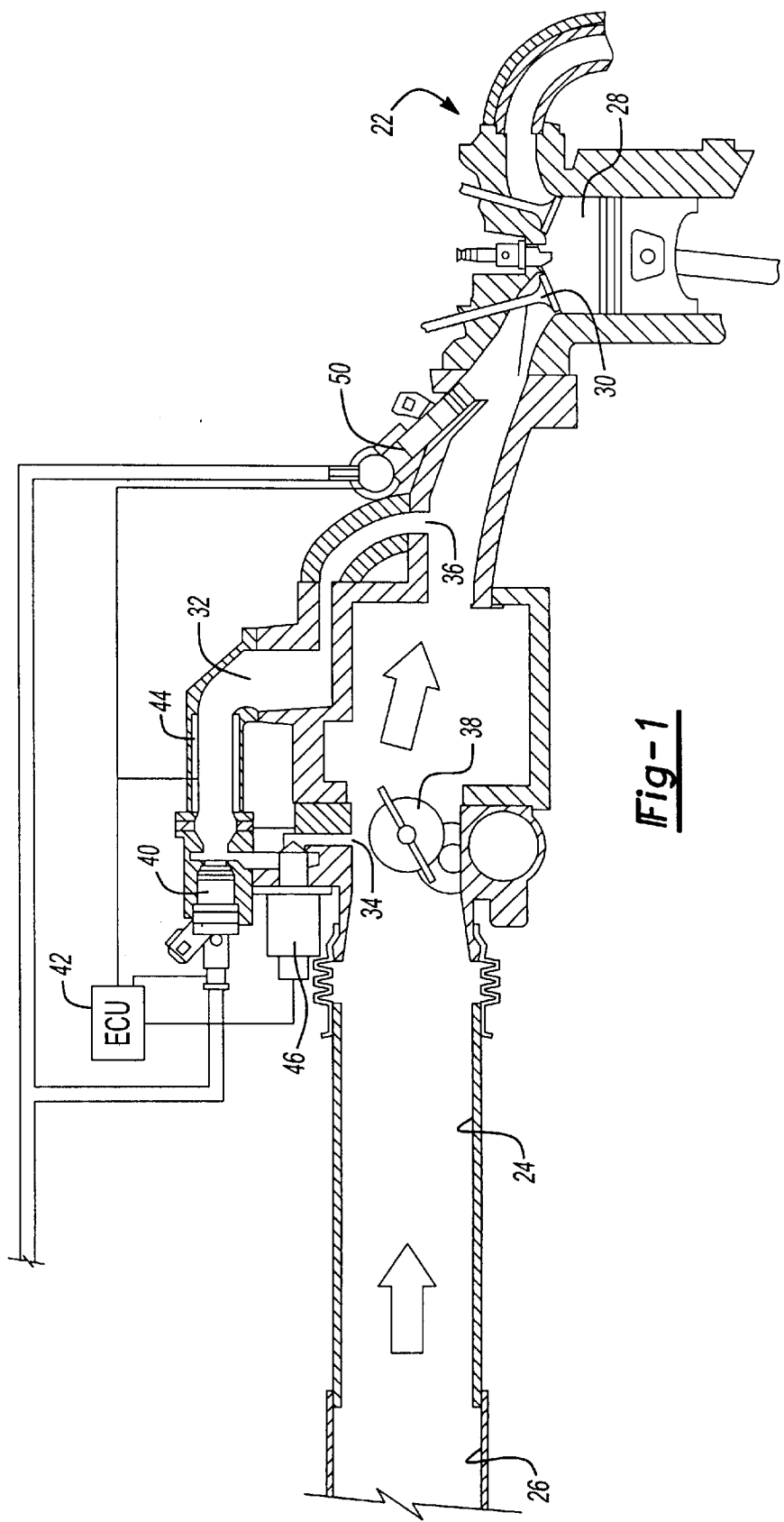
FIG. 1 is a diagrammatic view illustrating a fuel system for an internal combustion engine.

With reference first to FIG. 1, a fuel delivery system 20 is there illustrated for use with an internal combustion engine 22 (illustrated only diagrammatically). The internal combustion engine 22 includes an intake manifold 24 having an intake end 26 into which air is inducted. The intake manifold 24, in the conventional fashion, fluidly connects the intake end 26 to one or more internal combustion chambers 28 of the internal combustion engine 22 through an intake valve 30.

Still referring to FIG. 1, a cold start fuel passageway 32 has its inlet end 34 open to the intake manifold 24. Similarly, the cold start fuel passageway 32 has an outlet end 36 which is also open to the intake manifold 24 but downstream from its inlet 34.

A throttle valve 38, which is preferably an electronically controlled valve, is operatively positioned within the intake manifold 24. The throttle valve 38 is movable between a closed position, in which the throttle valve 38 substantially obstructs airflow directly through the intake manifold 24 from its intake end 26 and to the internal combustion chamber 28, and an open position in which airflow from the intake end 26 of the manifold 24 flows freely to the combustion chamber 28.

When in its closed position, the throttle valve 38 extends across the intake manifold 24 immediately downstream from the inlet 34 to the cold start fuel passageway 32. Consequently, when in its closed position, the throttle valve 38 diverts inducted airflow from the intake end 26 of the intake manifold 24 through the cold start fuel passageway 32.

A cold start fuel injector 40, when activated by an electronic control unit 42 (ECU) (illustrated only diagrammatically), injects fuel into the cold start fuel passageway 32. Furthermore, the ECU 42 also selectively controls the activation of a heater 44 disposed in the passageway 32 to facilitate and enhance vaporization of the fuel from the cold start fuel injector 40.

The ECU is preferably microprocessor based and programmed to perform the various engine management functions. The functions include, inter alia, control of the heater 44, the cold start fuel injector 40 and throttle 38.

Optionally, an air valve 46 controls the airflow through the cold start fuel passageway 32. This air valve 46 may be either a binary valve, i.e. either open or closed, or a modulated air valve which variably restricts the airflow from the intake 34 and through the cold start fuel passageway 32. The ECU 42 also controls the actuation of the air valve 42, if present.

Still referring to FIG. 1, the internal combustion engine 22 also includes a multipoint fuel injector 50 associated with each combustion chamber 28. The multipoint fuel injector 50, when activated by the ECU 42, injects fuel from the injector 50 and into the combustion chamber 28.

In the conventional fashion, during a cold start operating condition, fuel is supplied to the engine 22 by the cold start fuel injector 40. Thus, during a cold start engine operating condition, the ECU 42 activates not only the cold start fuel injector 40 but also the heater 44. At this time the ECU 42 also disables the operation of the multipoint fuel injectors 50. The cold start fuel injector 40, together with the heater 44, enables a relatively lean air/fuel mixture to be supplied to the combustion chamber 28 to thereby minimize noxious emissions from the engine 22 prior to heat up of the catalytic converter (not shown) commonly associated with the internal combustion engine 22.

The cold start fuel system, i.e. the cold start fuel injector 40, heater 44 and their associated components, thus provides the entire fuel charge to the engine 22 until a warm engine operating condition is achieved. Such an engine cold start typically lasts for approximately two minutes until the warm engine operating condition and the resulting activation of the catalytic converter is achieved. The ECU 42 then transitions the fuel supply to the engine from the cold start fuel injector 40 to the multipoint fuel injectors 50 and, thereafter, the multipoint fuel injectors 50 provide the entire fuel supply to the engine 22.

During certain operating conditions, however, fuel vapors and even pooled fuel can occur in the cold start fuel passageway 32. For example, an engine shut down during a cold start operating cycle for the engine 22 may result in fuel vapor and/or pooled fuel in the cold start passageway 32. Such fuel vapor and/or pooled fuel may create an undesirable emission of noxious fumes and even an engine backfire upon a subsequent restart of the engine 22 unless dissipated in accordance with the present invention.

Figure 2:
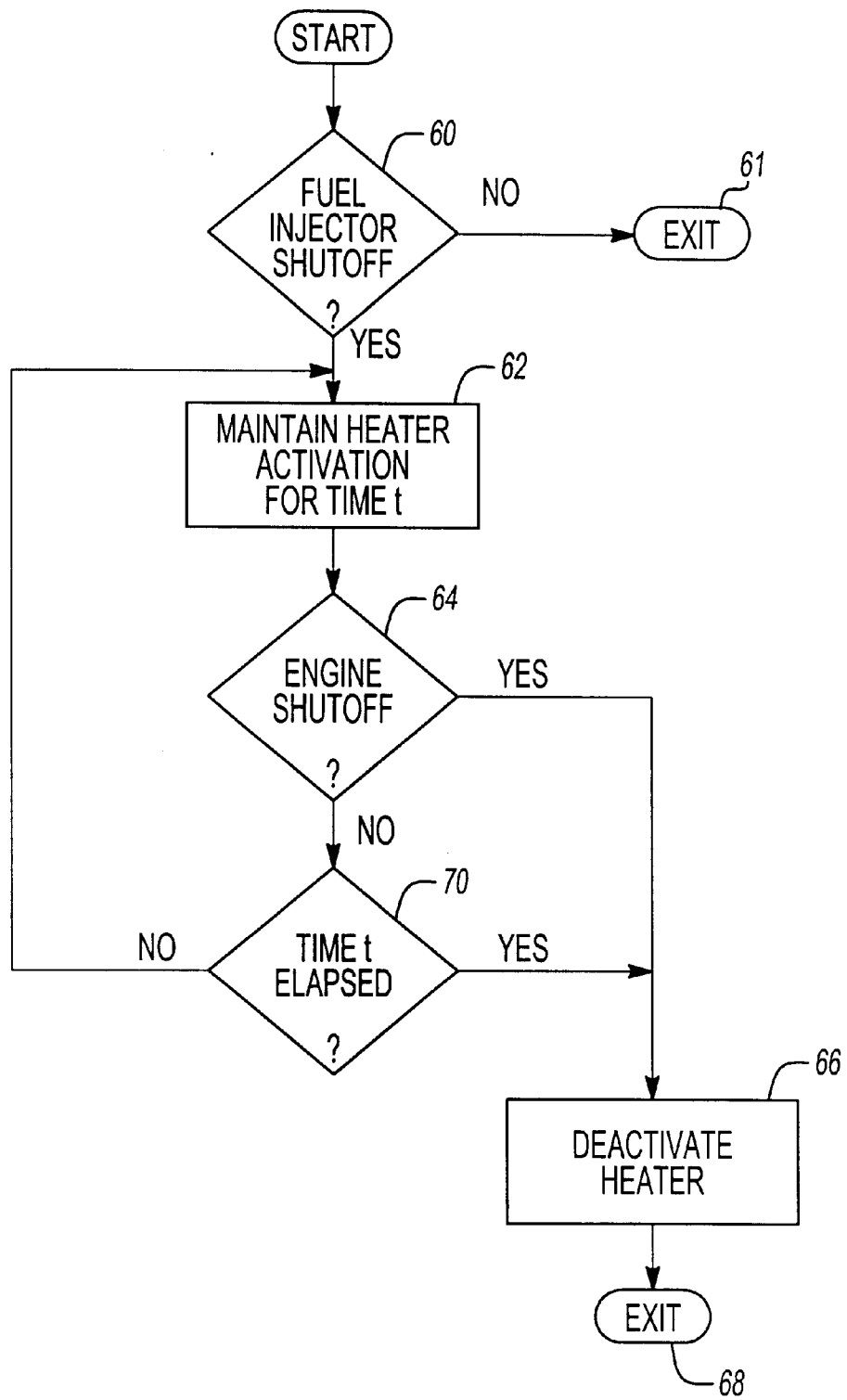
FIG. 2 is a flowchart illustrating a first embodiment of the present invention.

With reference now to FIG. 2, a first strategy utilized by the ECU 42 is illustrated for dissipating fuel and fuel vapors from the cold start fuel passageway 32 at the end of the cold start operating cycle. At step 60, the ECU 42 first determines the end of the cold start operating cycle by determining whether or not the ECU 42 has deactivated the cold start fuel injector 40. If so, step 60 then proceeds to step 62. Otherwise, step 60 exits the procedure at step 61.

At step 62, the ECU 42 maintains the activation of the heater 44 and then branches to step 64. At step 64 the ECU 42 determines whether or not an engine shut off has occurred. If so, step 64 branches to step 66 and deactivates the heater 44. Such deactivation of the heater 44 is desirable to conserve battery power. Step 66 then proceeds to step 68 which terminates the dissipation strategy illustrated in FIG. 2.

Conversely, assuming that no engine shut off has occurred and that the engine has, instead, proceeded into a warm engine operating condition in which the multipoint fuel injectors 50 provide fuel to the engine, step 64 instead branches to step 70. Step 70 determines whether or not the time t necessary to ensure complete vaporization of any fuel contained in the cold start fuel passageway 32 has elapsed. The time t will vary between two seconds and one minute depending upon the engine size, engine speed, ambient temperature and other factors. If not, step 70 branches back to step 62 where the above procedure is reiterated. Conversely, if the time t has elapsed, step 70 instead branches to step 62 which deactivates the heater 44 and then exits from the routine at step 68.

In this fashion the ECU effectively dissipates fuel and fuel vapor from the cold start fuel passageway by ensuring vaporization of the fuel in the cold start passageway and its induction into the combustion chambers.

Figure 3:
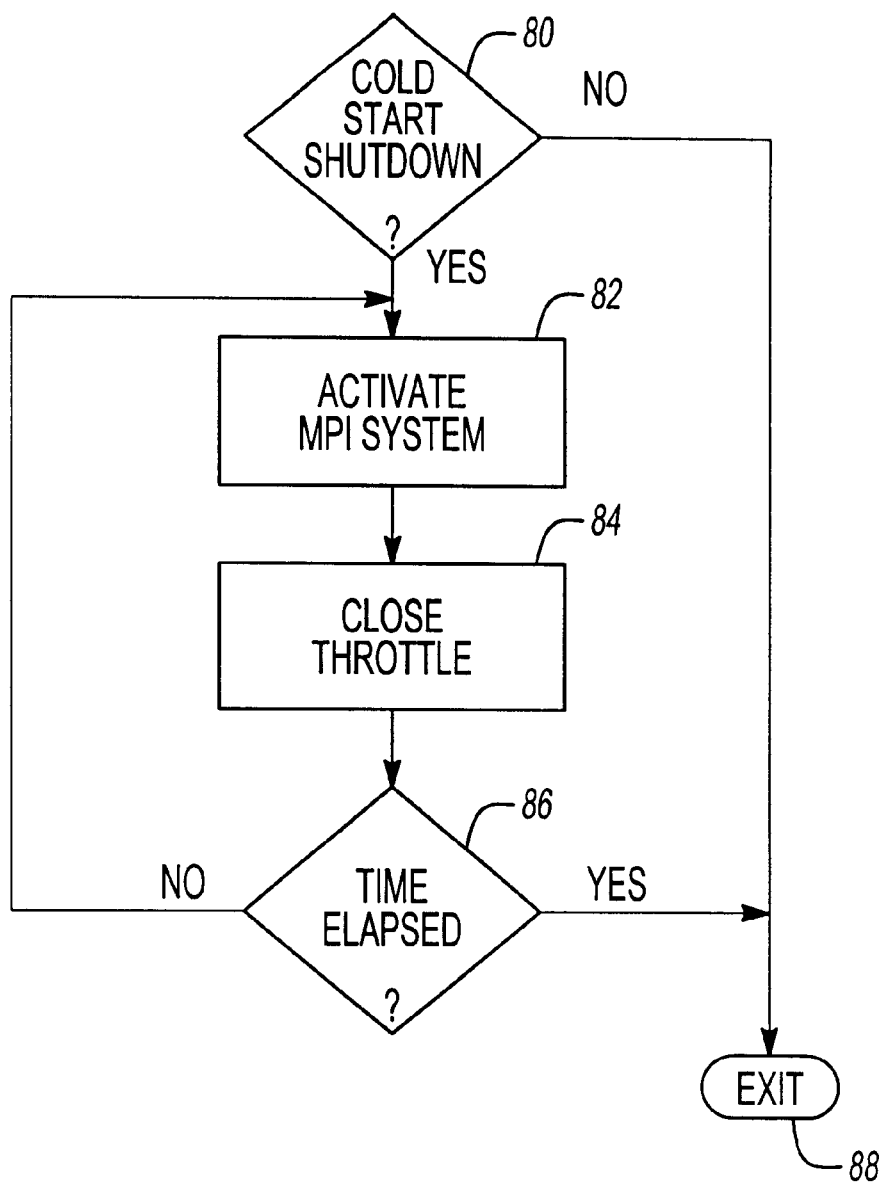
FIG. 3 is a flowchart illustrating the operation of still a further embodiment of the present invention.

With reference now to FIGS. 1 and 3, a still further procedure for dissipating fuel in the cold start fuel passageway is illustrated which is particularly useful for dissipating entrapped fuel within the cold start fuel passageway 32 caused by a shut down of the engine during a cold engine operating cycle.

At step 80, the ECU 42 first determines whether or not an engine shut down has occurred during a cold start operating cycle. Any conventional means may be used by the ECU 42 to determine a shut down during the cold start operating cycle. Preferably, however, the ECU 42 will utilize the activation of the cold start fuel injector 40 as an indication of a cold engine operating condition although other means, such as temperature sensors and elapsed time from initiation of the cold start fuel system, elapsed time from engine ignition, etc., may be alternatively employed. In any event, if a shut down during a cold start engine operating condition is detected, step 80 branches to step 82.

At step 82 the ECU 42 activates the multipoint fuel injection system such that the multipoint fuel injectors 50 provide fuel to the internal combustion chamber 28 for a predetermined time period, preferably less than ten seconds, following the engine shut down. During this operating condition, the fuel provided to the combustion chamber 28 by the multipoint fuel injectors 50 will ensure the continued induction of fuel/air into the combustion chambers. To ensure that the airflow through the intake manifold 24 passes through the cold start fuel passageway 32, thus dissipating fuel and fuel vapor within the cold start fuel passageway 32 for combustion in the combustion chamber 28, step 82 branches to step 84 in which the ECU 42 closes the throttle 38 thus diverting the airflow through the intake manifold 24 through the cold start fuel passageway 32. Step 84 then branches to step 86.

At step 86, the ECU 42 determines whether or not the desired time of activation for the multipoint fuel injection system has elapsed. If not, step 86 branches to step 82 and reiterates the above steps. Conversely, if the time has elapsed, step 86 then exits at step 88. Likewise, in the event that a cold engine shut down has not occurred, step 80 also branches to step 88 which terminates the procedure.

Figure 4:
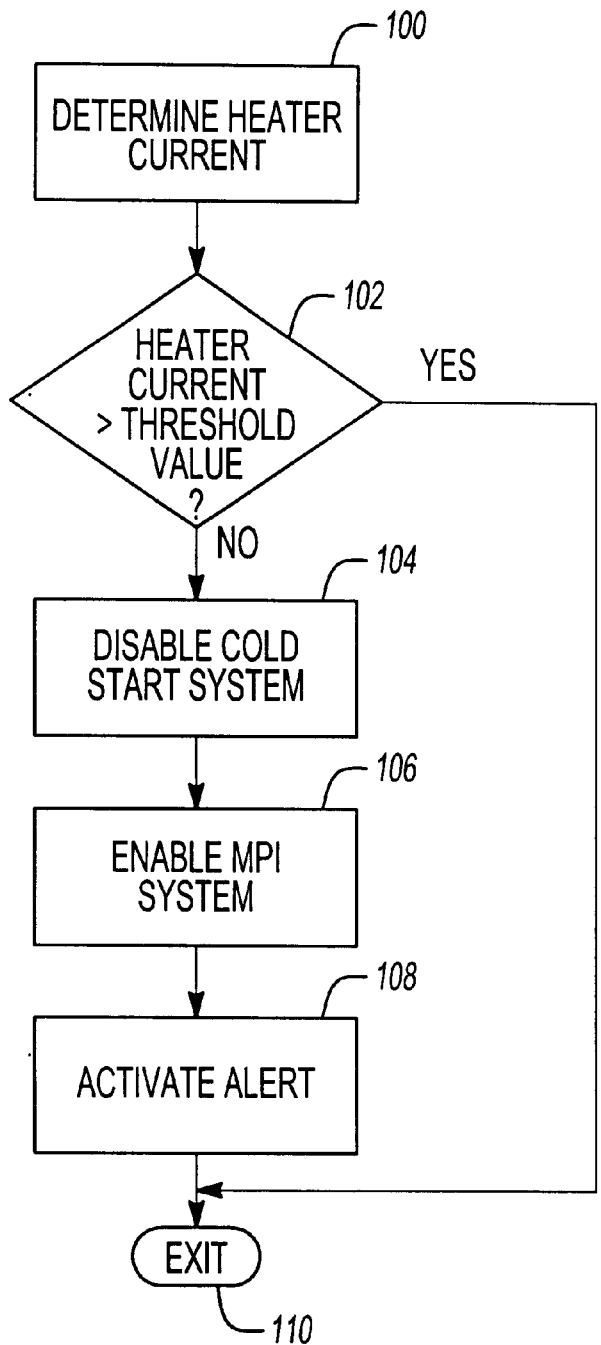
FIG. 4 is a flowchart illustrating yet a further embodiment of the present invention.

With reference now to FIGS. 1 and 4, a still further procedure for dissipating fuel vapor within the cold start fuel passageway 32 is illustrated during a cold start engine operating condition. At step 100 the ECU 42 determines the current of the cold start heater 44. Any conventional means, such as a current shunt which provides an analog signal to the ECU 42, may be utilized to determine the heater current. Likewise, conventional analog/digital converters are used by the ECU 42 to convert the data into usable format by the ECU. Step 100 then branches to step 102.

At step 102, the ECU 42 compares the heater current determined at step 100 with a threshold value. This threshold value, furthermore, is indicative of a properly operating cold start heater 44. A heater current less than the threshold value would be indicative of an improperly functioning cold start heater 44. Such an improperly operating cold start heater 44, if left uncorrected, would result in excess fuel and fuel vapor within the cold start fuel passageway 32.

In the event that the heater current is less than the threshold value, step 102 branches to step 104 where the ECU deactivates the cold start system by deactivating the cold start fuel injector 40. Step 104 then proceeds to step 106 in which the multipoint fuel injector system is activated to permit continued operation of the engine 22. Step 106 then branches to step 108 and optionally alerts the user of a malfunction of the cold start fuel system. Step 108 then exits the strategy at step 110.

Conversely, in the event that the heater current is greater than the threshold value, indicative that the heater 44 is operating properly, step 102 instead branches to step 110 thus terminating the procedure.

Whenever the ECU 42 determines a malfunction of the heater current 44, the ECU 42 stores this malfunction indication as data. Thereafter, upon subsequent restarts of the engine 22, the ECU 42 automatically deactivates the cold start fuel injection system until repair of the heater 44. In doing so, accumulation of fuel within the cold start fuel passageway 32 is minimized on subsequent engine restarts thus dissipating fuel from the cold start fuel passageway 32.

Figure 5:
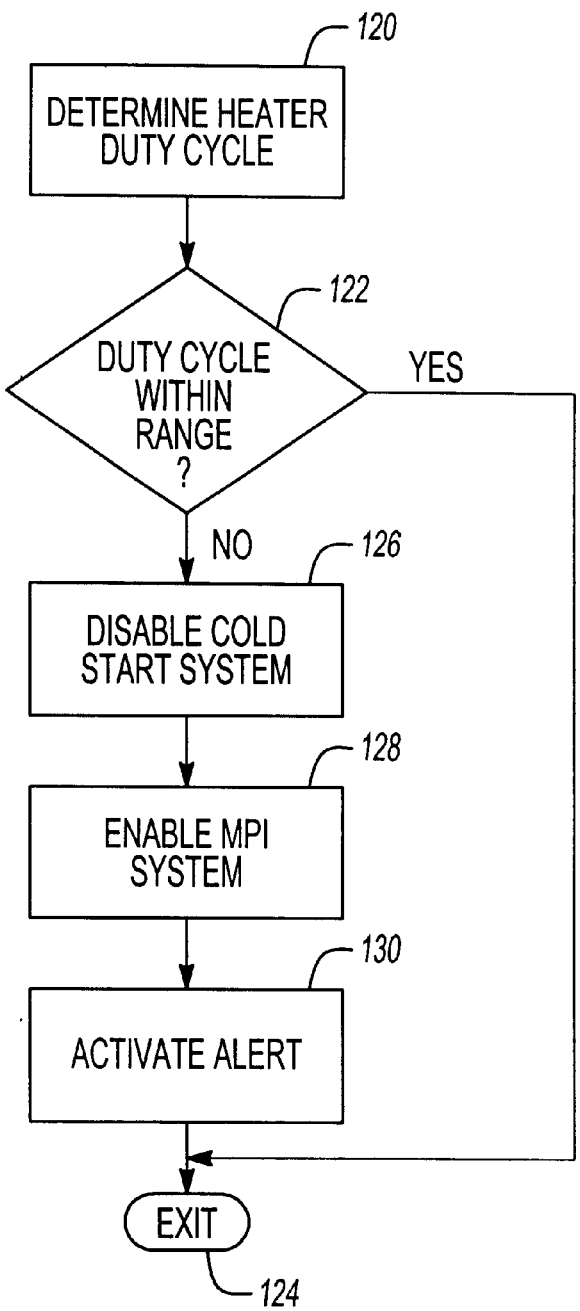
FIG. 5 is a flowchart illustrating a still further embodiment of the present invention.

With reference now to FIGS. 1 and 5, a further procedure for dissipating fuel within the cold start fuel passageway 32 which may occur from a malfunction of the cold start fuel injector 40 is illustrated. At step 120 and during a cold start cycle, the ECU 42 determines the duty cycle of the cold start fuel injector 40. Step 120 then branches to step 122.

At step 122, the ECU 42 compares the duty cycle of the cold start fuel injector 40 as determined at step 120 with a predetermined range indicative of normal operation of the cold start fuel injector 40. If the duty cycle is within the acceptable range, step 122 branches to step 124 and exits the routine.

Conversely, if the duty cycle for the cold start fuel injector 40 is outside the acceptable range, step 122 instead branches to step 126 where the ECU 42 disables the cold start fuel system. Step 126 then proceeds to step 128 which activates the multipoint injector fuel system to enable continued operation of the engine 22. Step 128 then proceeds to step 130 and optionally signals an alert to the user of a malfunction of the multipoint fuel injector. Step 130 then proceeds to step 124 and exits the routine. Upon detecting a malfunction of the multipoint fuel injector in accordance with the method set forth in FIG. 5, the ECU stores this information as data. Upon subsequent restarts of the engine 22, the ECU will prevent activation of the cold start fuel system thus preventing the accumulation of fuel vapor within the cold start fuel passageway 32 until the cold start fuel injector 40 has been repaired.

Figure 6:
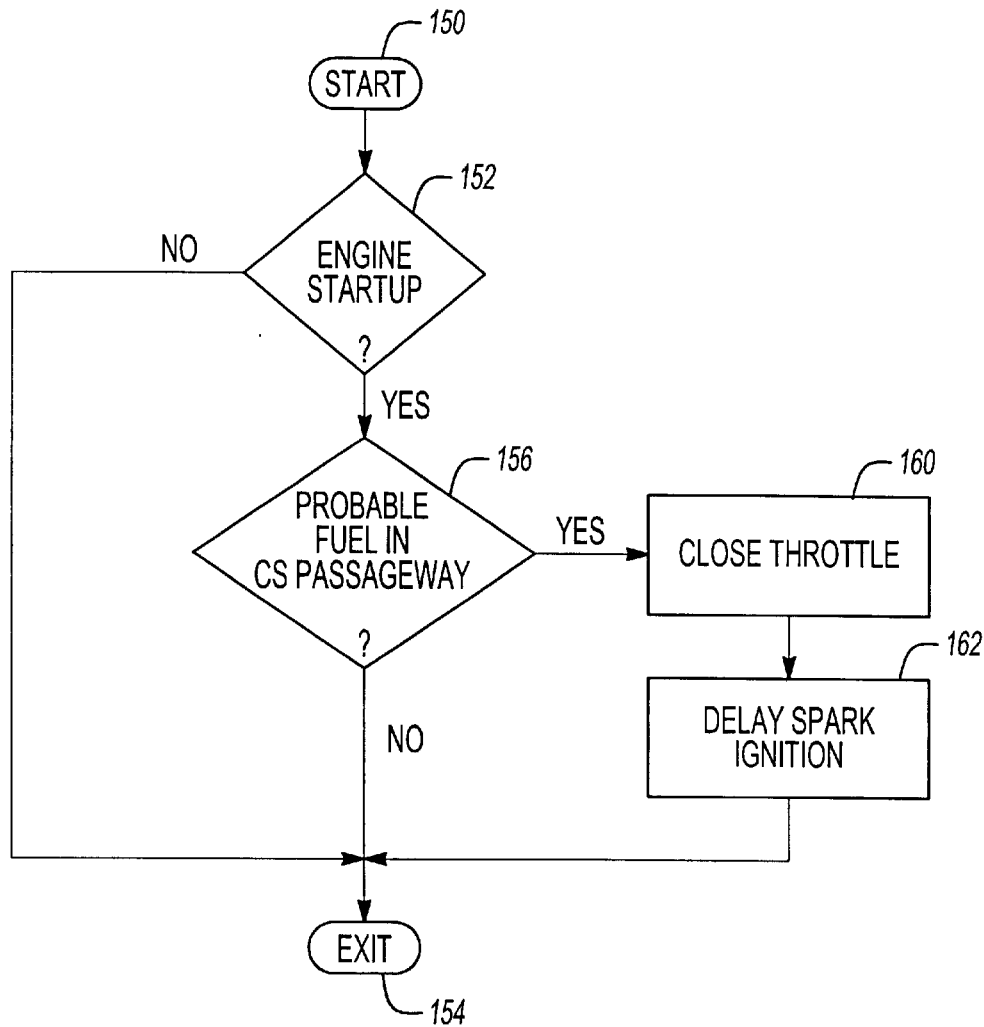
FIG. 6 is a flowchart illustrating a still further embodiment of the present invention.

With reference now to FIGS. 1 and 6, a still further procedure is illustrated to dissipate fuel vapor in the cold start fuel passageway upon engine start up. At step 150 the procedure initiates variables, etc. and then proceeds to step 152.

At step 152 the ECU 42 determines whether an engine start up condition has occurred. If not, step 152 branches to step 154 and exits the procedure. Otherwise, step 152 branches to step 156.

At step 156 the ECU 42 determines the probability of fuel vapor or even pooled fuel in the cold start fuel passageway 32. As previously discussed, such fuel can result from a malfunction of a component of the cold start system or a previous engine shut down during a cold start engine operating condition. In any event, if the ECU 42 determines no probability of fuel in the cold start fuel passageway, step 156 branches to step 154 and exits from the procedure. Otherwise, step 156 branches to step 160.

At step 160 the ECU 42 optionally closes the throttle 38 provided that the throttle is electronically controlled. By thus closing the throttle 38, air flow inducted into the intake manifold 24 is diverted through the cold start fuel passageway. Step 160 then proceeds to step 162 where the ECU 42 delays initiation of the spark ignition system for a few revolutions of the engine. In doing so, the ECU 42 ensures that air inducted by the engine is diverted through the cold start fuel passageway 32 so that any latent fuel in the cold start fuel passageway 32 is dissipated by induction into the combustion chambers. The delay of the spark ignition system as a part of this procedure also eliminates the possibility of engine backfire upon engine startup from fuel vapors in the cold start fuel passageway 32.

From the foregoing, it can be seen that the present invention provides a means for determining the probability of excess fuel in the cold start fuel passageway and for dissipating that excess fuel. Such excess fuel can occur as a result of a component failure of the cold start fuel system or, alternatively, from a shut down of the engine during the cold start cycle.

Although in the preferred embodiment of the invention, the ECU 42 controls the operation not only of the cold start fuel system but also the multipoint fuel injection system, it will, of course, be understood that a separate control circuit may be utilized for the cold start system and a second control circuit utilized for control of the multipoint injection system. In either case, preferably the ECU 42, whether a single or multiple component, comprises a programmable multiprocessor having the ability not only to execute stored computer programs, but also capable of storing data regarding the condition of the cold start fuel system.

Furthermore, any and all of the fuel dissipating procedures may be used alone or in combination with the others.

Having described my invention, however, many modifications thereto will become apparent to those skilled in the art to which it pertains without deviation from the spirit of the invention as defined by the scope of the appended claims.

We claim:

1. For use in conjunction with an internal combustion engine having a cold start fuel injector which, when activated, introduces fuel to the engine through a cold start fuel passageway during a cold engine condition, a system for management of fuel in the cold start fuel passageway comprising:

an engine control unit which controls the operation of fuel delivery to the engine, said engine control unit being programmed to make a determination of a probability of fuel within the cold start passageway, and said engine control unit being programmed to perform a procedure to dissipate fuel in the cold start passageway in response to said determination of the probability of fuel in the cold start fuel passageway.

2. The invention as defined in claim 1 wherein the cold start device includes a heater which, when activated, facilitates vaporization of liquid fuel and wherein said procedure comprises maintaining activation of the heater for a predetermined time period following deactivation of the cold start fuel injector.

3. The invention as defined in claim 2 wherein said predetermined time period is between two seconds and one minute.

4. The invention as defined in claim 2 wherein said engine control unit deactivates the heater upon a shut down of the engine.

5. The invention as defined in claim 1 wherein said engine control unit determines the probability of fuel within the cold start fuel passageway whenever the engine is shut down during a cold engine condition.

6. The invention as defined in claim 1 wherein said engine control unit determines the probability of fuel within the cold start fuel passageway by the elapsed time between engine ignition and engine shut down whenever the engine is shut down during a cold engine condition.

7. The invention as defined in claim 5 wherein the engine includes a multipoint fuel injection system which provides fuel to the engine during a warm engine operating condition, and wherein said procedure comprises maintaining activation of the multipoint fuel injection system for a predetermined time period during shut down of the engine during a cold engine operating condition.

8. The invention as defined in claim 7 wherein said predetermined time period is less than ten seconds.

9. The invention as defined in claim 7 wherein and comprising means for diverting a portion of airflow through an intake manifold of the engine through the cold start fuel passageway.

10. The invention as defined in claim 7 wherein the engine includes a throttle which controls airflow through the intake manifold and wherein said diverting means comprises programmed means in said engine control unit for closing the throttle.

11. The invention as defined in claim 1 wherein the engine uses spark ignition to combust fuel and wherein said procedure comprises delaying initiation of the spark ignition on a subsequent engine start up in response to a determination of the probability of fuel in the cold start fuel passageway by the engine control unit to thereby dissipate fuel in the cold start fuel passageway.

12. The invention as defined in claim 1 wherein an electrically powered heater is disposed in the cold start fuel passageway and wherein said procedure comprises determining the heater current, comparing the heater current with a predetermined threshold value and deactivating the cold start fuel injector when the heater current is less than said threshold value.

13. The invention as defined in claim 1 wherein an electrically powered heater is disposed in the cold start fuel passageway and wherein said procedure comprises storing a value corresponding to the heater current during the prior engine shut down, comparing this value to a threshold amount upon a subsequent engine start up and deactivating the cold start fuel injector upon said subsequent engine start up whenever the stored value is less than said threshold amount.

14. The invention as defined in claim 1 wherein said engine control unit is programmed to determine a duty cycle of activation of the cold start fuel injector and to compare said duty cycle with a predetermined duty cycle range, and wherein said procedure comprises deactivating the cold start fuel injector when said duty cycle falls outside said predetermined duty cycle range.

15. A fuel management system for an internal combustion engine comprising:
a programmable engine control unit which manages the delivery of fuel to the engine,
a cold start fuel passageway,
a cold start fuel injector which, when activated by said engine control unit, introduces fuel to the engine through said cold start fuel passageway,
said engine control unit being programmed to determine the probability of fuel within the cold start passageway and generate an excess fuel signal representative thereof, and
programmed means in the engine control unit responsive to said excess fuel signal for dissipating fuel in the cold start passageway.

16. The invention as defined in claim 15 wherein the fuel management system further comprises:
an electrically powered heater which, when activated under control of said engine control unit, facilitates vaporization of liquid fuel, and
wherein said programmed dissipating means comprises means for maintaining activation of said heater for a predetermined time period following deactivation of the cold start fuel injector.

17. The invention as defined in claim 16 wherein said predetermined time period is between two seconds and one minute.

18. The invention as defined in claim 16 wherein said programmed dissipating means deactivates the heater upon a shut down of the engine.

19. The invention as defined in claim 15 wherein said engine control unit generates said excess fuel signal when the engine is shut down during a cold engine condition.

20. The invention as defined in claim 19 wherein the engine includes a multipoint fuel injection system which provides fuel to the engine during a warm engine operating condition, and wherein said programmed dissipating means activates the multipoint fuel injection system for a predetermined time period after shut down of the engine during a cold engine operating condition.

21. The invention as defined in claim 20 wherein said predetermined time period is less than ten seconds.

22. The invention as defined in claim 20 wherein said programmed dissipating means further comprises means for diverting a portion of airflow through an intake manifold of the engine through the cold start fuel passageway.

23. The invention as defined in claim 22 wherein the engine includes a throttle which controls airflow through the intake manifold and wherein said diverting means comprises means for closing the throttle.

24. The invention as defined in claim 15 wherein the engine utilizes a spark ignition system to combust fuel and wherein said programmed dissipating means comprises means for delaying initiation of the spark ignition system in response to said excess fuel signal during a subsequent engine start up condition.

25. The invention as defined in claim 15 and comprising an electrically powered heater in said cold start fuel passageway, and wherein said programmed dissipating means comprises a means for determining the heater current, means for comparing the heater current with a threshold value and means for deactivating the cold start fuel injection when the heater current is less than said threshold value.

26. The invention as defined in claim 15 wherein the fuel management system further comprises:
an electrically powered heater which, when activated under control of said engine control circuit, facilitates vaporization of liquid fuel, and
wherein said programmed dissipating means comprises means for storing a value corresponding to the heater current during the prior engine shut down, means for comparing said stored value to a threshold amount upon a subsequent engine start up and for deactivating said cold start fuel injector whenever said stored value is less than said threshold amount.

27. The invention as defined in claim 15 wherein said engine control unit determines a duty cycle of activation of the cold start fuel injector and compares said duty cycle with a predetermined duty cycle range, and wherein said programmed dissipating means deactivates the cold start fuel injector when said duty cycle falls outside said predetermined duty cycle range.

28. For use in conjunction with an internal combustion engine having multipoint injection normally operable to supply fuel to the engine during a warm engine operating condition, an engine control circuit, a cold start fuel injector which, when activated by said engine control circuit, injects fuel into a cold start passageway, an electrically powered heater in the cold start passageway to facilitate vaporization of liquid fuel, a method for improved engine performance comprising the steps of:
determining the presence of excess fuel in the cold start fuel passageway during an engine transient condition and generating a signal in response thereto,
dissipating the excess fuel in the cold start fuel passageway in response to said signal.

29. The invention as defined in claim 28 wherein said dissipating step comprises the step of maintaining activation of the heater for a predetermined period after deactivation of the cold start fuel injector.

30. The invention as defined in claim 28 wherein said dissipating step comprises the step of activating the multi-point fuel injection for a predetermined period.

31. The invention as defined in claim 28 wherein said dissipating step comprises the step of delaying initiation of the spark ignition system for a predetermined time period in the event of said signal from said determining step and upon engine start up.

32. The invention as defined in claim 28 wherein said dissipating step comprises the steps of:

determining the value of the heater current, comparing the heater current with a predetermined threshold, deactivating the cold start fuel injector if said value is less than said threshold.

33. The invention as defined in claim 28 wherein said determining step comprises the step of comparing the heater current with a predetermined threshold.

* * * * *